United States Patent
Lew

(10) Patent No.: US 9,853,676 B2
(45) Date of Patent: Dec. 26, 2017

(54) ALTERNATIVE ROUTING OF WIRELESS DATA ONTO POWER SUPPLY

(71) Applicant: Apple Inc., Cupertino, CA (US)

(72) Inventor: Leland W. Lew, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/641,317

(22) Filed: Mar. 7, 2015

(65) Prior Publication Data

US 2016/0094368 A1 Mar. 31, 2016

Related U.S. Application Data

(60) Provisional application No. 62/057,872, filed on Sep. 30, 2014.

(51) Int. Cl.
| | |
|---|---|
| *H04W 4/00* | (2009.01) |
| *H04B 1/40* | (2015.01) |
| *H04B 3/54* | (2006.01) |
| *H04L 12/10* | (2006.01) |

(52) U.S. Cl.
CPC ............. *H04B 1/40* (2013.01); *H04B 3/54* (2013.01); *H04L 12/10* (2013.01)

(58) Field of Classification Search
CPC ............................. H04L 25/0272; H04B 1/40
See application file for complete search history.

(56) References Cited

U.S. PATENT DOCUMENTS

| | | | |
|---|---|---|---|
| 4,884,265 A | 11/1989 | Schroeder et al. | |
| 8,213,456 B2 | 7/2012 | Terashima et al. | |
| 8,780,711 B2 * | 7/2014 | Baliga | H04L 45/125 370/230 |
| 9,225,551 B2 * | 12/2015 | Fouren | H04L 12/2807 |
| 2002/0021209 A1 * | 2/2002 | Fisher | H04B 3/542 307/1 |

(Continued)

FOREIGN PATENT DOCUMENTS

| | | |
|---|---|---|
| TW | 201315182 A | 4/2013 |
| TW | 201337536 A | 9/2013 |
| WO | 2011/143763 A1 | 11/2011 |

OTHER PUBLICATIONS

PCT/US2015/046661, International Search Report and Written Opinion, dated Oct. 7, 2015 for PCT Patent Application No. PCT/US2015/046661, 11 pages, dated Oct. 7, 2015, 11 pages.

(Continued)

*Primary Examiner* — Dac Ha
(74) *Attorney, Agent, or Firm* — Kilpatrick Townsend & Stockton, LLP

(57) ABSTRACT

Circuits, methods, and apparatus that may provide a wired communication path that is simple to implement and does not greatly increase costs and complexity. One example may provide an electronic device having wired data path, where the wired data path is implemented using a power connection. Data from a wireless signal path may be routed and combined with a power supply voltage. This combined signal may then be provided to, or received from, a second electronic device over the power connection. The combined signal may be provided at a power connection that may include a power and ground path, paths for multiple power supplies, or paths for multiple power supplies and ground.

9 Claims, 7 Drawing Sheets

(56) References Cited

U.S. PATENT DOCUMENTS

| | | |
|---|---|---|
| 2002/0181446 A1* | 12/2002 | Preston ................ G01S 5/0027 |
| | | 370/352 |
| 2004/0162086 A1* | 8/2004 | Han ....................... G01S 19/06 |
| | | 455/456.1 |
| 2004/0198430 A1 | 10/2004 | Moriyama et al. |
| 2005/0083890 A1* | 4/2005 | Plotnik .................... H04B 1/40 |
| | | 370/334 |
| 2006/0093081 A1* | 5/2006 | Ibrahim .................... H04L 7/08 |
| | | 375/354 |
| 2006/0252370 A1 | 11/2006 | Goossens et al. |
| 2007/0002772 A1 | 1/2007 | Berkman et al. |
| 2007/0167144 A1 | 7/2007 | Koga et al. |
| 2008/0259888 A1* | 10/2008 | Terashima ............... H04B 3/54 |
| | | 370/338 |
| 2009/0011710 A1* | 1/2009 | Kapoor ............... G06F 13/4004 |
| | | 455/42 |
| 2009/0235000 A1 | 9/2009 | Takada et al. |
| 2010/0276498 A1* | 11/2010 | Rofougaran ......... G06K 7/0008 |
| | | 235/492 |
| 2011/0281530 A1 | 11/2011 | Hazani et al. |
| 2011/0286393 A1 | 11/2011 | Fouren et al. |
| 2014/0177692 A1 | 6/2014 | Yu et al. |

OTHER PUBLICATIONS

Taiwanese Office Action for Application No. 104128492, dated Apr. 11, 2016, 20 pages.
Examination Report No. 1 dated May 25, 2017 in Australian Patent Application No. 2017100239, 8 pages.

* cited by examiner

ALTERNATIVE ROUTING OF WIRELESS DATA ONTO POWER SUPPLY

CROSS-REFERENCES TO RELATED APPLICATIONS

This application claims the benefit of U.S. provisional patent application No. 62/057,872, filed Sep. 30, 2014, which is incorporated by reference.

BACKGROUND

Electronic devices, such as portable media players, storage devices, tablets, netbooks, laptops, desktops, all-in-one computers, wearable computing devices, cell, media, and smart phones, televisions, monitors, and other display devices, navigation systems, and other devices have become ubiquitous in recent years. Many of these devices now communicate wirelessly. In fact, many users may prefer to have devices communicate wirelessly to avoid having to make connections between devices using cables and other wires.

Also, it may be desirable to reduce the number of connector receptacles on an electronic device. These connector receptacles consume area along an outside of a device, consume space in the device, add costs, detract from the device's appearance, and form leakage paths for water and other corrosive fluids.

Accordingly, many devices currently rely heavily, if not exclusively, on wireless connections to other devices. Wireless communications may include the transfer of files and data that may be used by programs and applications on the device. Other wireless communications may involve relatively large files. These files may be firmware files, system updates, and other such files. These files may often be transferred to a device during manufacturing and testing of the device. For example, these files may be used to initially program the device. Since these files are large, their transfer to a device may consume a great deal of time, thereby slowing the manufacturing process and increasing costs.

Also, wireless communications may not be as robust as wired communication. Errors in wireless data transmission may be more likely than wired data transmissions. This may be due to environmental and interference factors, which may require re-transmission of faulty data packets or re-programming, thereby further increasing manufacturing time and costs or user time and effort. For these reasons, it may be desirable to have an alternative wired signal path that may be used by either or both manufacturers and users that is simple and low cost to implement.

Thus, what is needed are circuits, methods, and apparatus that may provide a wired communication path that is simple to implement and does not greatly increase costs and complexity of a device's hardware and software.

SUMMARY

Accordingly, embodiments of the present invention may provide circuits, methods, and apparatus that may provide a wired communication path that is simple to implement and does not greatly increase costs and complexity. Many devices that communicate wirelessly may include a power connection for charging. An illustrative embodiment of the present invention may provide an electronic device having wired data path, where the wired data path is implemented using this power connection in order to minimize the connector pin-count and reduce the size, cost, and complexity of a connector solution. In this and other embodiments of the present invention, the connector pin-count may be as low as 2 pins, one for a data-over-power pin and one for a ground pin. Specifically, data from a wireless signal path may be routed and combined with a power supply voltage. This combined signal may then be provided to, or received from, a second electronic device over the power connection. The combined signal may be received or provided at a power connection that may include pins, contacts, or other paths for power and ground, for multiple power supplies, or for multiple power supplies and ground. In other examples, the power connection may be an inductive or capacitive power connection. For example, a combined signal may be received or provided at a power pin, contact, or other path in a power connector, where the power connector may also include a ground pin, contact, or other path. In order to minimize system impact, cost, and size, the device's internal data path portion of this combined signal may heavily leverage existing wireless data circuits. In this way a wireless signal path may be at least partially reused in a wired signal path. This may simplify the design of the wired signal path and help control or reduce costs.

In order to simultaneously combine the data and power signals, a Frequency-Division-Multiplexed (FDM) scheme may be used which modulates the data signal at a low intermediate frequency (IF), combined with a power signal at DC. In addition, the data signal may heavily leverage existing wireless data circuits, which may already used for normal wireless operation. These existing wireless circuits may require only minimal modifications to provide a baseband or low-IF signal to a new, but simple, modulator/demodulator for combining or extracting the data signal and the power signal.

An illustrative embodiment of the present invention may provide an electronic device that may receive a combined data and power signal at a power connection. The power signal may be extracted by filtering and used to power circuits in the electronic device. A first data signal may be extracted by filtering and provided to circuitry in a radio signal (RF) signal path. The RF signal path may extract data from the data signal and provide it to remaining circuitry in the electronic device. The first data signal may be an RF signal that is received and demodulated by an RF demodulator, an RF and intermediate frequency (IF) demodulator combination, or other demodulation circuit. The demodulated signal may be further processed by a baseband circuit before being provided to other circuits in the electronic device.

In this and other embodiments of the present invention, a second data signal may be extracted by filtering and provided to a second data path. This second data path may include demodulator circuitry that may demodulate the second data signal before providing data to other circuits in the electronic device.

In this example, the power signal and one or more data signals may be received by the electronic device. In this and other embodiments of the present invention, the power supply may be provided by the electronic device while the one or more data signals are received by the electronic device. In this and other embodiments of the present invention, the power supply may be received by the electronic device while the one or more data signals are provided by the electronic device.

In still other embodiments of the present invention, the power supply and the one or more data signals may be provided by the electronic device. For example, an RF signal path may receive a first data signal. The first data signal may be transformed to a baseband signal, an IF modulated signal, an RF modulated signal, or other signal. This transformed first data signal may be combined with a power signal and provided at a power connection.

In this and other embodiments of the present invention, a second data signal may be provided to a second data path. This second data path may include modulation circuitry that may modulate the second data signal before providing the modulated second data signal to be combined with the transformed first data signal and power signal.

In the above examples, data may be transferred in a unidirectional or bidirectional half-duplex manner. That is, two or more data signals having different carrier frequencies may be simultaneously conveyed over a single power path in a power connector. In these and other embodiments of the present invention, one, two, or more data signals may be transferred in a bidirectional full-duplex manner. In this and other embodiments, the received and transmitted data for each data stream may be conveyed at different frequencies.

In various embodiments of the present invention, it may be desirable to combine an IF modulated signal with a power supply, or to extract an IF modulated signal from a power supply. In these cases, it may be that the RF signal path either does not use an IF modulator or the IF modulator may not be accessible. In these cases, a separate IF modulator may be provided. The second IF modulator may demodulate a received IF signal and provide it to a baseband circuit. The second IF modulator may also modulate a baseband signal from a baseband circuit and provide it to be combined with a power signal, one or more other data signals, or both.

Various embodiments of the present invention may include an RF signal path. This RF signal path may be included on an electronic device for wireless communications such as Wi-Fi, Bluetooth, cellular, near-field, or other wireless communications. These and other embodiments of the present invention may include a second signal path that may include a modem, such as a frequency-shift keying modulator/demodulator, phase-shift keying modulator/demodulator, or other type of modem.

Embodiments of the present invention may provide communications circuits for various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These communications circuits may provide pathways for signals that are compliant with one or more various standards such as Universal Serial Bus (USB), High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In various embodiments of the present invention, the paths provided by these communication circuits may be used to convey power, ground, signals, test points, and other voltage, current, data, or other information.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
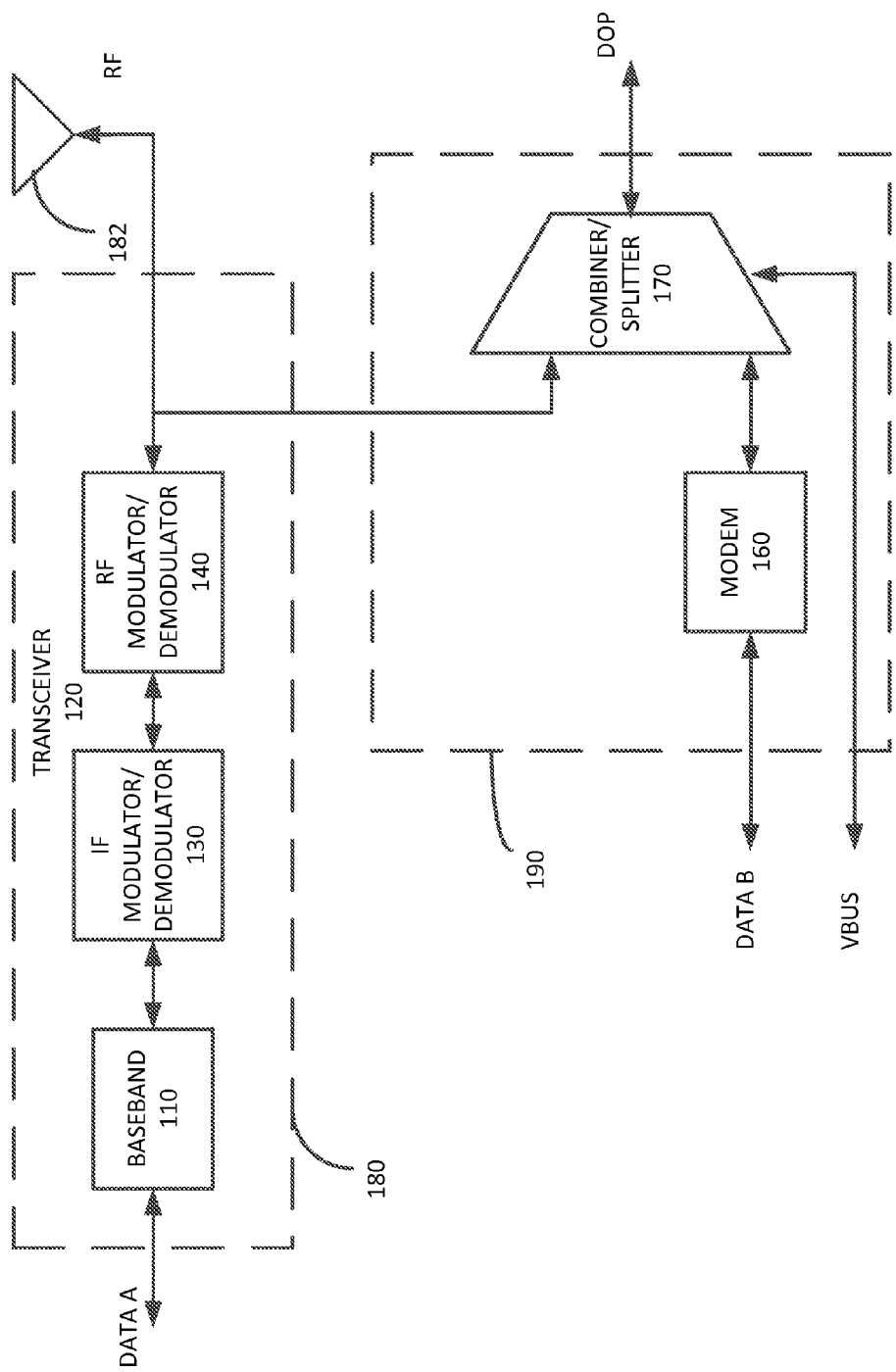
FIG. 1 illustrates communication circuitry according to an embodiment of the present invention.

FIG. 1 illustrates communication circuitry according to an embodiment of the present invention. This figure, as with the other included figures, is shown for illustrative purposes and does not limit either the possible embodiments of the present invention or the claims.

This figure includes a first signal path 180. First signal path 180 may be an integrated circuit, portion of an integrated circuit, or it may be formed of one or more integrated or other circuits. Signal path 180 may be an RF signal path for wireless communications. This RF signal path 180 may be designed for Wi-Fi, Bluetooth, cellular, near field, or other wireless communications. RF signal path 180 may include baseband circuit 110 and transceiver 120. Transceiver 120 may include an IF modulator/demodulator 130 and RF modulator/demodulator 140. In other embodiments of the present invention, transceiver 120 may include only an RF modulator/demodulator 140, or it may include one or more of these and other circuits. Each modulator/demodulator may include a modulator in the transmit path and a demodulator in the receive path.

During RF communications, DATA A may be received by baseband circuit 110. The baseband data from baseband circuit 110 may be modulated to an intermediate frequency by IF modulator/demodulator 130. This intermediate frequency signal may be modulated by RF modulator/demodulator 140 and provided as an RF signal to antenna 182. Also, RF data may be received at antenna 182, demodulated by RF modulator/demodulator 140 and provided to IF modulator/demodulator 130. The demodulated data may be provided by IF modulator/demodulator 130 to baseband circuit 110, which may convert it into the signal DATA A. The signal DATA A may be provided to other circuitry in the electronic device.

This figure may also include a second data path 190. Second signal path 190 may be an integrated circuit, portion of an integrated circuit, or it may be formed of one or more integrated or other circuits. This second data path may include a combiner-splitter 170. Combiner-splitter 170 may combine a signal received from RF signal path 180 with a power supply signal received either from the electronic device or from a second electronic device and provide the combined signal on power connection DOP, where DOP is an acronym for data-over-power. In these and other embodiments of the present invention, combiner-splitter 170 may use filtering to extract a data signal from a received signal at the power connection DOP. Combiner-splitter 170 may provide the extracted signal to RF signal path 180. Combiner-splitter 170 may also extract a power supply VBUS from the received signal or receive a power supply VBUS and combine it with a received data signal. In this way wireless signal path 180 may be at least partially reused in a wired signal path. This may simplify the design of the wired signal path and help control or reduce costs.

The second data path 190 may receive or provide a second data signal. In this example, a second data signal, DATA B, may be provided to modem 160. Modem 160 may modulate the DATA B signal and provide it to combiner-splitter 170. Combiner-splitter 170 may combine this data with data received from RF signal path 180. The combiner-splitter 170 may provide the combined data signals and power over the power connection DOP. Alternatively, combined modulated data and power signals may be received at connection DOP by combiner-splitter 170, filtered, and provided to modem 160. Modem 160 may then demodulate the received modulated data signal and provide the demodulated data signal as DATA B to other circuitry in the electronic device. Combiner-splitter 170 may receive or provide a power supply over line VBUS.

In an illustrative embodiment of the present invention, a combined signal and power supply may be received by an electronic device at the power connector DOP. Combiner-splitter 170 may use filtering to extract a first data signal and provide it to RF signal path 180. RF signal path 180 may demodulate this signal and provide an output DATA A to other circuitry on electronic device. In this example, the first modulated signal may be an RF modulated signal that is demodulated by RF modulator/demodulator 140 and IF modulator/demodulator 130 before being provided to baseband circuitry 110. A second data signal may be received and filtered by combiner-splitter 170 and provided to modem 160. Modem 160 may demodulate the second signal and provide it as DATA B to other circuitry in the electronic device. A power supply may also be received, filtered, and provided as a power supply signal VBUS. In this and other embodiments of the present invention, the power supply VBUS may be received by combiner-splitter 170 and combined with the data signals.

In another illustrative embodiment of the present invention, a first data signal, DATA A, may be provided to RF signal path 180. This signal may be received and processed by baseband circuit 110 and provided to IF modulator/demodulator 130. The output of IF modulator/demodulator 130 may be provided to RF modulator/demodulator 140. RF modulator/demodulator 140 may provide the RF signal to combiner-splitter 170.

A second data signal, DATA B, may be received by modem 160. Modem 160 may modulate the data and provide modulated data to combiner-splitter 170. Combiner-splitter 170 may combine the modulated data signals and provide them and a power supply as a combined signal at the power supply connection DOP. In other embodiments of the present invention, these data signals may be provided by combiner-splitter 170 to the power connection DOP, while the power supply VBUS may be received at the power connection DOP.

The power connection DOP may include a path for a power supply and a path for ground. In other embodiments of the present invention, the power connection DOP may include a power and ground path, paths for multiple power supplies, or paths for multiple power supplies and ground. That is, the combined signal may be received or provided at a power connection that may include pins, contacts, or other paths for power and ground, for multiple power supplies, or for multiple power supplies and ground. In other examples, the power connection may be an inductive or capacitive power connection. For example, a combined signal may be received or provided at a power pin, contact, or other path in a power connector, where the power connector may also include a ground pin, contact, or other path Again, embodiments of the present invention may combine multiple data signals on one power supply connection pin, contact, or other path. An example of how this may be done is shown in the following figure.

Figure 2:
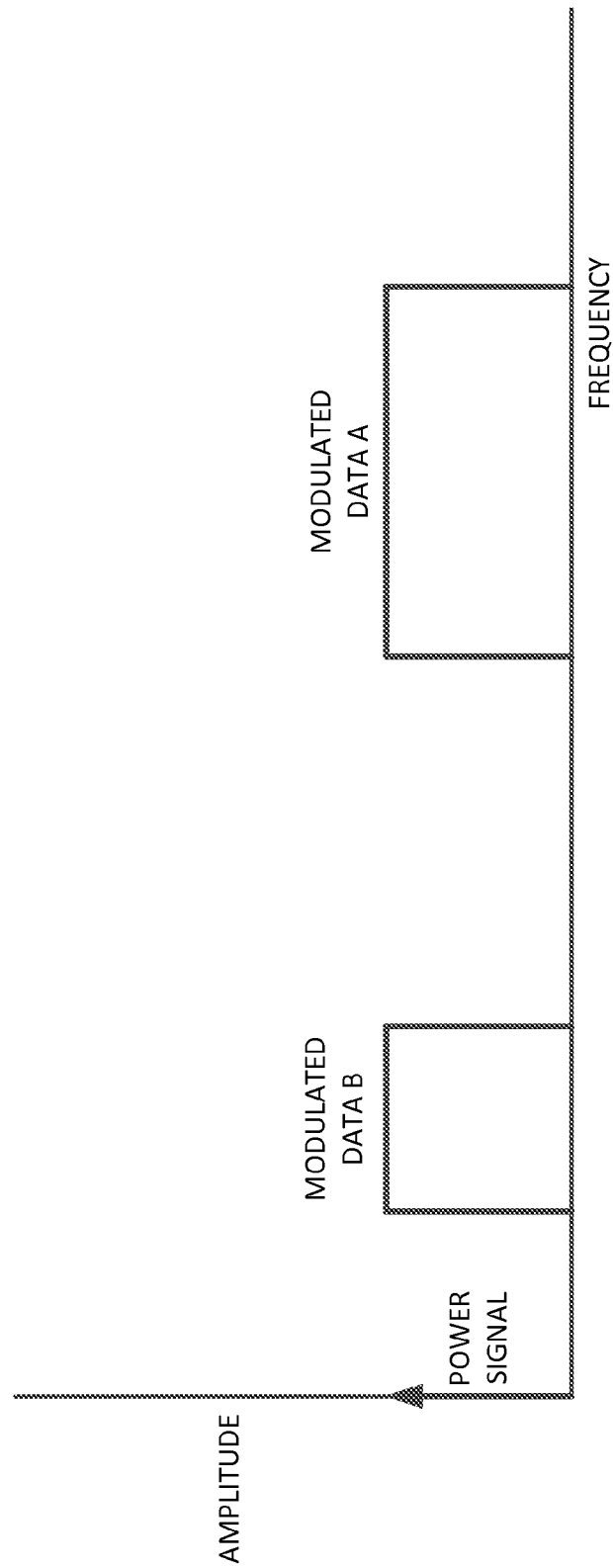
FIG. 2 illustrates a frequency spectrum of a combined signal at a power connection according to an embodiment of the present invention.

FIG. 2 illustrates a frequency spectrum of a combined signal at a power connection according to an embodiment of the present invention. This combined signal may include a modulated DATA A signal at a first frequency or frequency range. The combined signal may include a modulated DATA B signal at a second frequency or frequency range. A power supply at DC or other frequency may also be included. For example, where inductive or capacitive charging is used, the power signal may be at a higher frequency of frequency range than DC.

In the above examples, each data path may be unidirectional, though each data path may not need to flow in the same direction. That is, DATA A may be input data while DATA B is output data, or DATA A may be output data while DATA B is input data. In these and embodiments of the present invention, data may be bidirectional half-duplex. That is, data in each path may flow in either direction, but data may flow only in one direction at a time in each path. Other embodiments of the present invention may further provide for communications that may be bidirectional full-duplex. That is, communications may flow in both directions at the same time in either or both paths. An example of how this may be done is shown in the following figure.

Figure 3:
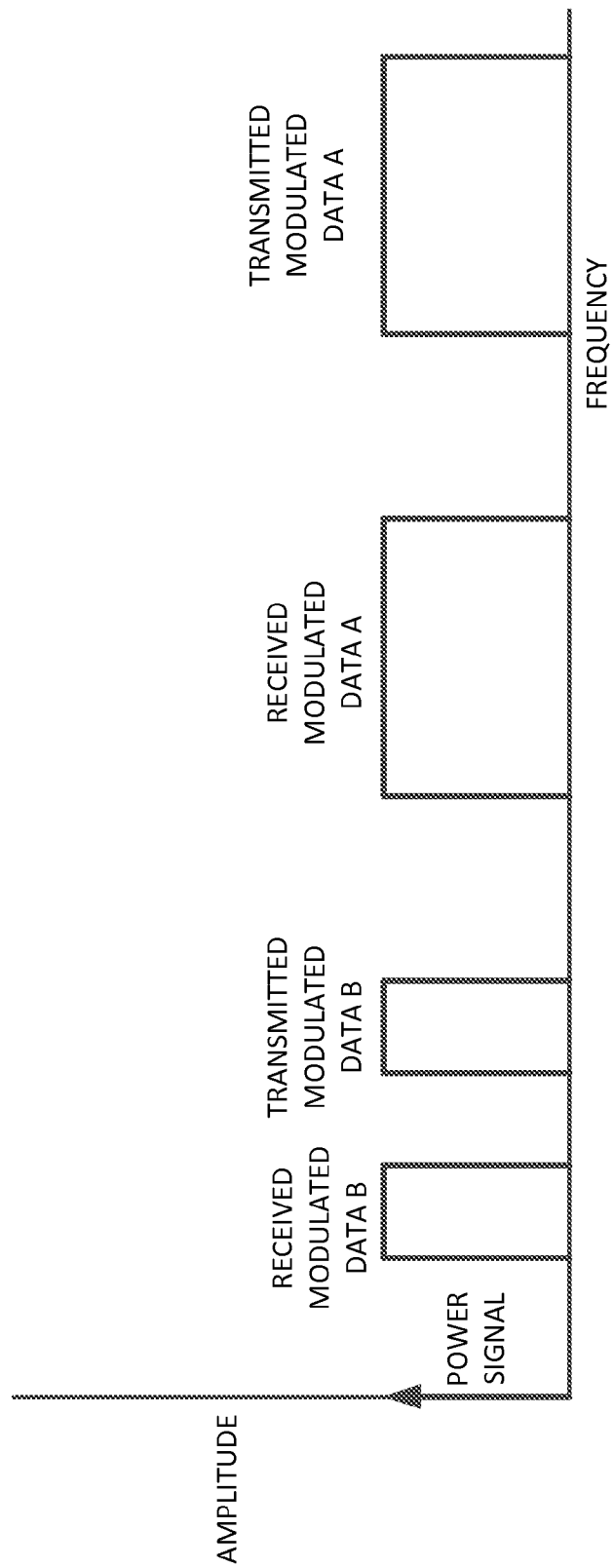
FIG. 3 illustrates a frequency spectrum of a combined signal at a power connection according to an embodiment of the present invention.

FIG. 3 illustrates a frequency spectrum of a combined signal at a power connection according to an embodiment of the present invention. This combined signal may include DATA A and DATA B at different frequencies, as before. Also, in this figure, received and transmitted data may be conveyed at different frequencies as well. This implementation may require the inclusion of additional modulation and demodulation circuitry. While both DATA A and DATA B signal paths are shown as being bidirectional full-duplex, in these and other embodiments of the present invention, neither, either, or both signal paths may be bidirectional full-duplex.

In the above example, the signal provided by the RF signal path is the RF modulated signal. In other embodiments of the present invention, an IF modulated signal may be provided. An example is shown in the following figure.

Figure 4:
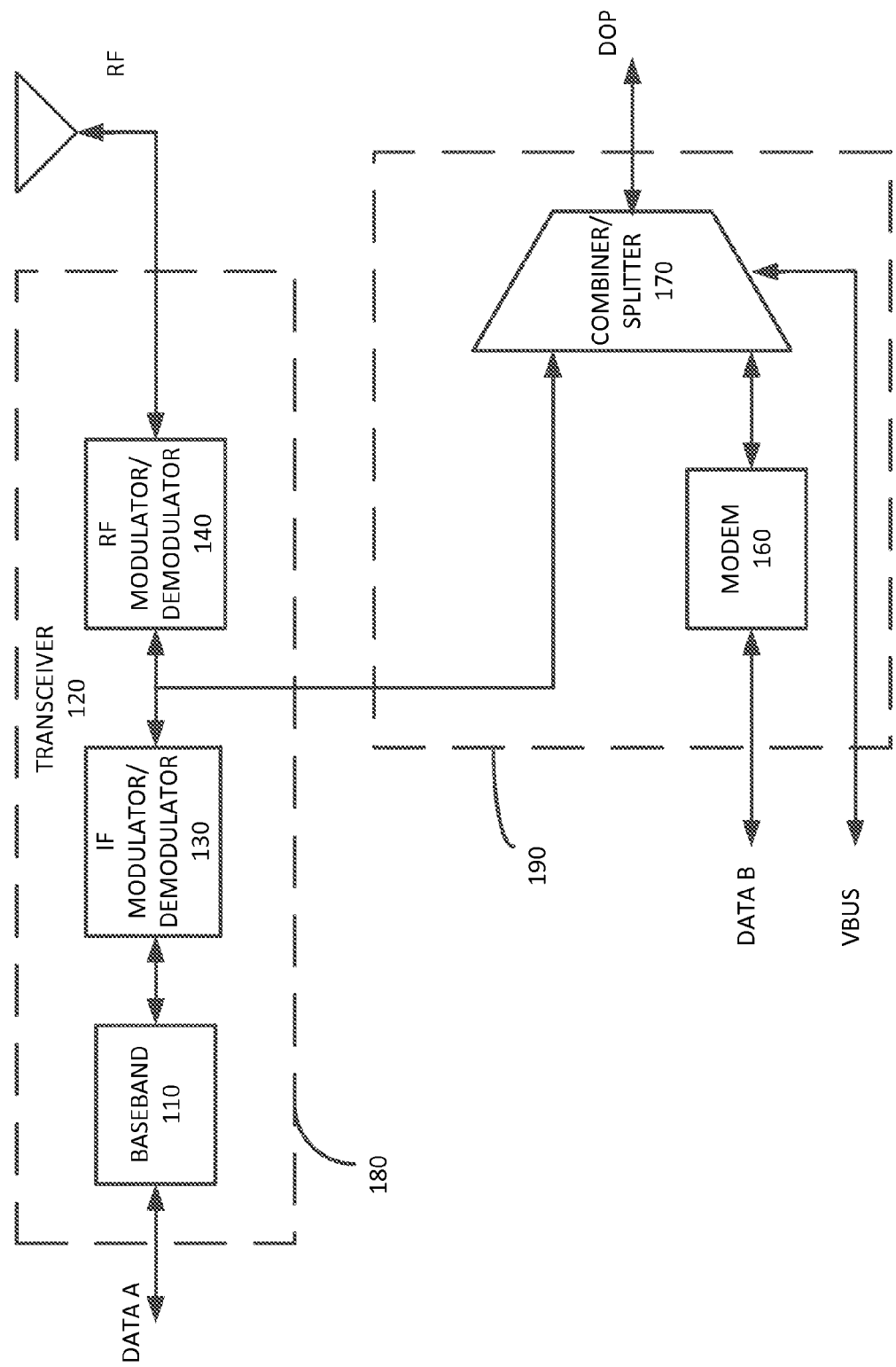
FIG. 4 illustrates communication circuitry according to an embodiment of the present invention.

FIG. 4 illustrates communication circuitry according to an embodiment of the present invention. In this figure, inputs and outputs of IF modulator/demodulator 130 may be connected to combiner-splitter 170. Accordingly, a combined data and power signal may be received at power connection DOP. An IF modulated data signal may be extracted by filtering and provided to IF modulator/demodulator 130 in RF signal path 180. IF modulator/demodulator 130 may provide demodulated data to baseband circuit 110, which may provide a signal DATA A to other circuitry in the electronic device. In this example, RF modulator/demodulator 140 may be powered down to save power and to prevent interference during data transmission. A second data signal may be filtered and extracted and provided to modem 160. Modem 160 may demodulate and provide a DATA B signal to other circuitry on the electronic device. A power supply signal VBUS may be extracted from the combined signal at the power connector DOP. In this and other embodiments of the present invention, the power supply signal VBUS may be received by combiner-splitter 170 and provided at the power connection DOP to a second electronic device.

In another example, data signal DATA A may be received by baseband circuit 110 and provided to IF modulator/demodulator 130. IF modulator/demodulator 130 may provide a modulated signal to combiner-splitter 170. A second data signal DATA B may be received by modem 160. Modem 160 may modulate this signal and provide it to combiner-splitter 170. Combiner-splitter 170 may combine these data signals and provide them at the power connection DOP. As before, power supply VBUS may be received by combiner-splitter 170 and provided to power connection DOP, or it may be received at power connection DOP and provided to the electronic device by combiner-splitter 170.

In these and other embodiments of the present invention, both data signals may be received by combiner-splitter 170 from the power connection DOP or both signals may be provided by combiner-splitter 170 to the power connection DOP. In these and other embodiments of the present invention, the signal DATA A may be received by combiner-splitter 170 from the power connection DOP while the DATA B signal may be provided to the power connection DOP by combiner-splitter 170, or the DATA A signal may be provided by the combiner-splitter 170 to the power connection DOP while the DATA B signal may be received from the power connection DOP by combiner-splitter 170. In short, in various embodiments of the present invention, at any one time, DATA A may be received or provided by combiner-splitter 170 from or to power connection DOP, the DATA B signal may be received or provided by combiner-splitter 170 from or to power connection DOP, and the power supply VBUS may be received or provided by combiner-splitter 170 from or to power connection DOP. Also, as shown above, receive and transmit data may be modulated at different frequencies such that either or both signal paths for DATA A and DATA B be may receive and transmit data simultaneously.

Figure 5:
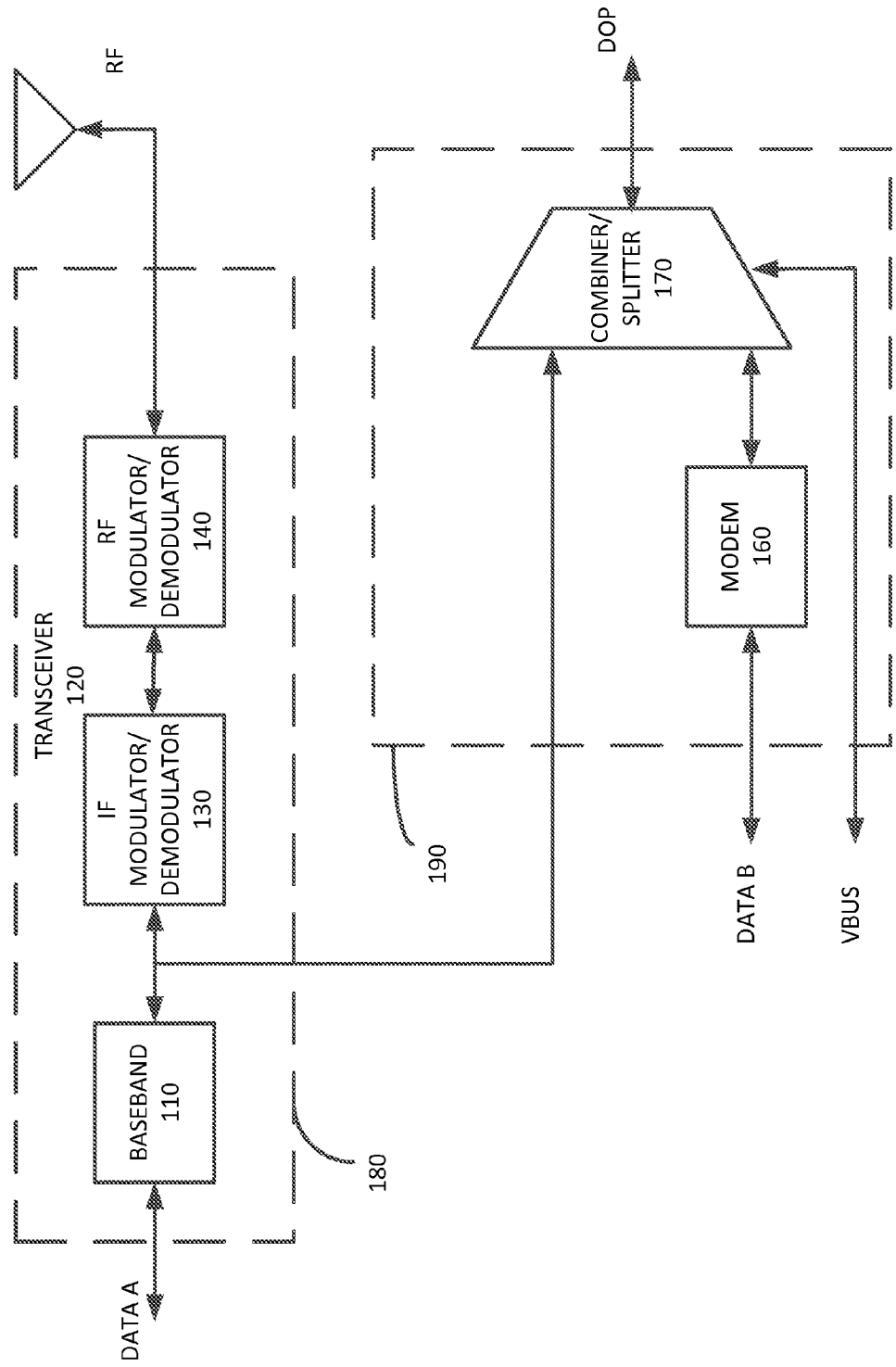
FIG. 5 illustrates communication circuitry according to an embodiment of the present invention.

FIG. 5 illustrates communication circuitry according to an embodiment of the present invention. In this figure, input and outputs of baseband circuit 110 may connect to combiner-splitter 170. Accordingly, a combined data and power signal may be received at power connection DOP. A baseband data signal may be extracted by filtering and provided to baseband circuit 110 in RF signal path 180. Baseband circuit 110 may provide a signal DATA A to other circuitry in the electronic device. In this example, either or both IF modulator/demodulator 130 and RF modulator/demodulator 140 may be powered down to save power and to prevent interference during data transmission. A second data signal may be extracted and filtered and provided to modem 160. Modem 160 may demodulate and provide a DATA B signal to other circuitry on the electronic device. A power supply signal VBUS may be extracted from the combined signal at the power connector DOP. In this and other embodiments of the present invention, the power supply signal VBUS may be received by combiner-splitter 170 and provided at the power connection DOP to a second electronic device.

In another example, data signal DATA A may be received by baseband circuit 110 and provided to combiner-splitter 170. A second data signal DATA B may be received by modem 160. Modem 160 may modulate this signal and provide it to combiner-splitter 170. Combiner-splitter 170 may combine these data signals and provide them at the power connection DOP. As before, power supply VBUS may be received by combiner-splitter 170 and provided to power connection DOP, or it may be received at power connection DOP and provided to the electronic device by combiner-splitter 170.

In various embodiments of the present invention, it may be desirable to transmit and receive IF modulated signals on the wired power connection DOP. In various embodiments of the present invention, the IF modulator/demodulator 130 may not exist, or it may not be accessible outside of the RF signal path. For example, an RF signal path may be a circuit that has been previously used and is not amenable to alterations that may be needed to gain access to IF modulator/demodulator 130. In these examples, the second signal path 180 may include an IF modulator/demodulator. An example is shown in the following figure.

Figure 6:
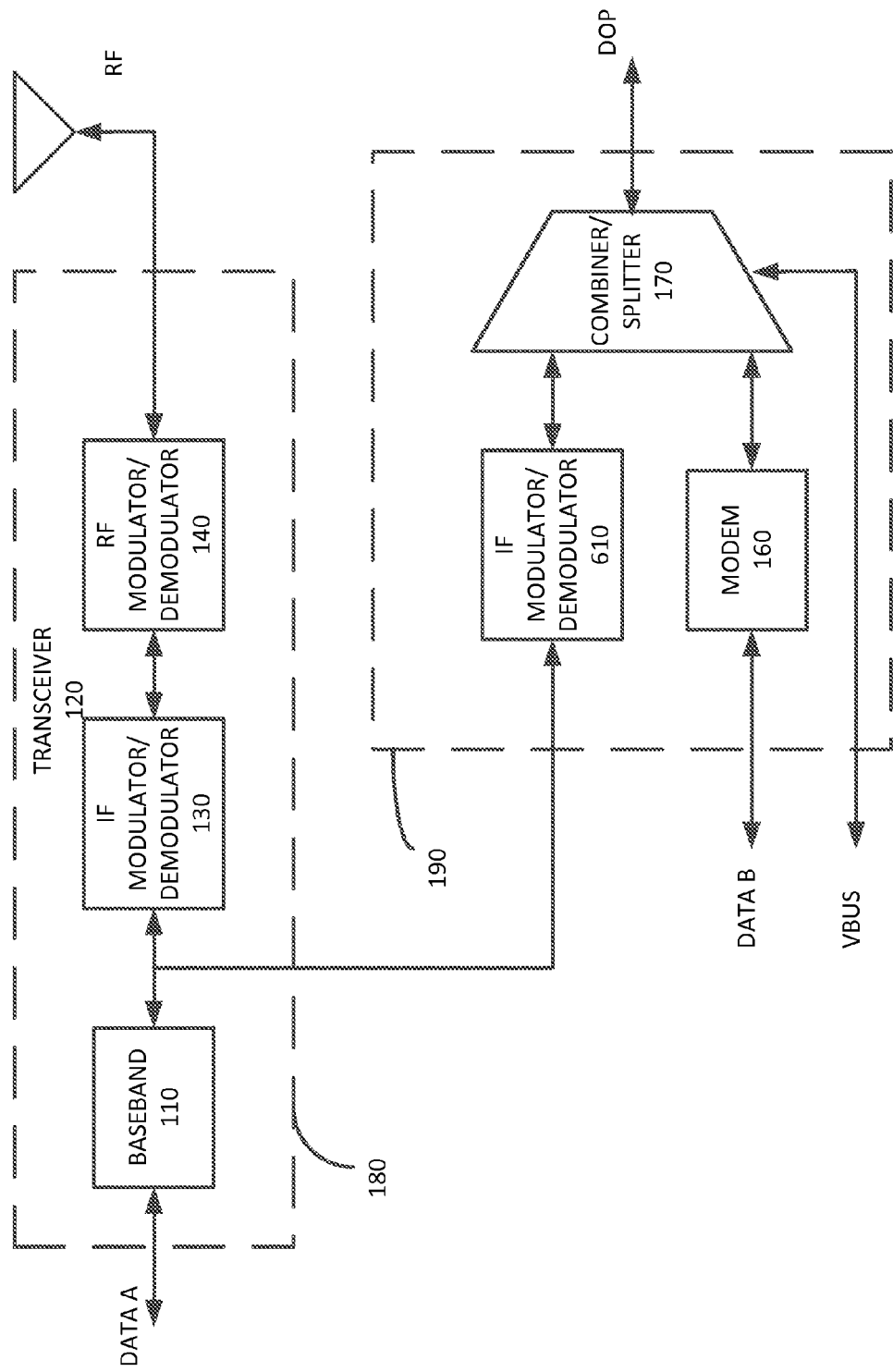
FIG. 6 illustrates communication circuitry according to an embodiment of the present invention.

FIG. 6 illustrates communications circuitry according to an embodiment of the present invention. In this example, inputs and outputs of baseband circuitry 110 may connect to IF modulator/demodulator 610. Accordingly, a combined data and power signal may be received at power connection DOP. An IF modulated data signal may be extracted by filtering and provided to IF modulator/demodulator 610 in signal path 190. IF modulator/demodulator 610 may provide demodulated data to baseband circuit 110, which may provide a signal DATA A to other circuitry in the electronic device. In this example, either or both IF modulator/demodulator 130 and RF modulator/demodulator 140 may be powered down to save power and to prevent interference during data transmission. A second data signal may be extracted and filtered and provided to modem 160. Modem 160 may demodulate and provide a DATA B signal to other circuitry on the electronic device. A power supply signal VBUS may be extracted from the combined signal at the power connector DOP. In this and other embodiments of the present invention, the power supply signal VBUS may be received by combiner-splitter 170 and provided at the power connection DOP to a second electronic device.

In another example, data signal DATA A may be received by baseband circuit 110 and provided to IF modulator/demodulator 610. IF modulator/demodulator 610 may provide a modulated signal to combiner-splitter 170. A second data signal DATA B may be received by modem 160. Modem 160 may modulate this signal and provide it to combiner-splitter 170. Combiner-splitter 170 may combine these data signals and provide them at the power connection DOP. As before, power supply VBUS may be received by combiner-splitter 170 and provided to power connection DOP, or it may be received at power connection DOP and provided to the electronic device by combiner-splitter 170.

In various embodiments of the present invention, it may be desirable to form the second signal path 190 as an integrated circuit that may be used in various applications. An example is shown in the following figure.

Figure 7:
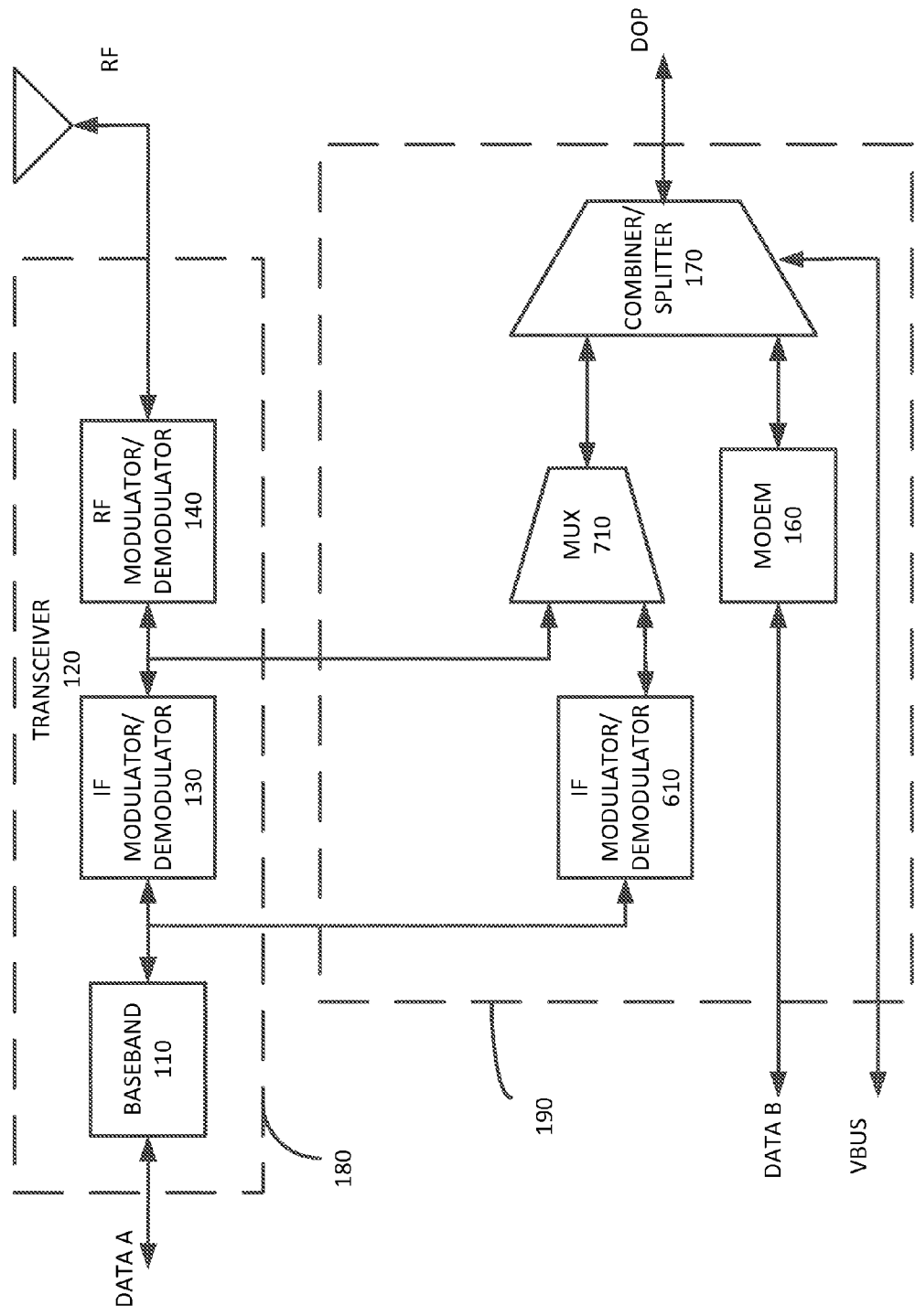
FIG. 7 illustrates communication circuitry according to an embodiment of the present invention.

FIG. 7 illustrates communications circuitry according to an embodiment of the present invention. In various applications, different nodes of the RF signal path 180 may be accessible to the second signal path 190. For example, the inputs and outputs of baseband circuit 110 may be accessible while the inputs and outputs of IF modulator/demodulator 130 are not accessible. For this reason, IF modulator/demodulator 610 may be included as before. Additionally, a multiplexer 710 may also be included. Multiplexer 710 may be included for designs where the inputs and outputs of IF modulator/demodulator 130 are accessible. In this case, IF modulator/demodulator 610 may be bypassed using multiplexer 710 and the inputs and outputs of IF modulator/demodulator 130 may connect through multiplexer 710 to combiner-splitter 170. Accordingly, a combined data and power signal may be received at power connection DOP. An IF modulated data signal may be extracted by filtering and provided to IF modulator/demodulator 610 via multiplexer 710 in signal path 190. IF modulator/demodulator 610 may provide demodulated data to baseband circuit 110, which may provide a signal DATA A to other circuitry in the electronic device. Alternatively, an IF modulated data signal may be extracted by filtering and provided to IF modulator/demodulator 130 in signal path 190 via multiplexer 710. IF modulator/demodulator 130 may provide demodulated data to baseband circuit 110, which may provide data signal DATA A to other circuitry in the electronic device. In this example, any or all of IF modulator/demodulator 130, IF modulator/demodulator 160, and RF modulator/demodulator 140 may be powered down to save power and to prevent interference during data transmission. A second data signal may be extracted and filtered and provided to modem 160. Modem 160 may demodulate and provide a DATA B signal to other circuitry on the electronic device. A power supply signal VBUS may be extracted from the combined signal at the power connector DOP. In this and other embodiments of the present invention, the power supply signal VBUS may be received by combiner-splitter 170 and provided at the power connection DOP to a second electronic device.

In another example, data signal DATA A may be received by baseband circuit 110 and provided either to IF modulator/demodulator 610 or IF modulator/demodulator 130. IF modulator/demodulator 610 or IF modulator/demodulator 130 may provide a modulated signal to combiner-splitter 170. A second data signal DATA B may be received by modem 160. Modem 160 may modulate this signal and provide it to combiner-splitter 170. Combiner-splitter 170 may combine these data signals and provide them at the power connection DOP. As before, power supply VBUS may be received by combiner-splitter 170 and provided to power connection DOP, or it may be received at power connection DOP and provided to the electronic device by combiner-splitter 170.

Embodiments of the present invention may provide communications circuits for various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These communications circuits may provide pathways for signals that are compliant with one or more various standards such as Universal Serial Bus (USB), High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In various embodiments of the present invention, the paths provided by these communication circuits may be used to convey power, ground, signals, test points, and other voltage, current, data, or other information.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of transmitting and receiving data, where transmitting data comprises:
   providing first data to a baseband circuit;
   receiving the first data from the baseband circuit with a first modulation circuit, the first modulation circuit to modulate the first data to a first frequency;
   providing second data to a modem circuit, the modem circuit to modulate the second data to a second frequency;
   receiving a power supply voltage; and
   combining the first data from the first modulation circuit, the second data from the modem circuit, and the power supply voltage, and providing the combined first data, second data, and power supply voltage over a wire; and
where receiving data comprises:
   receiving a combination of third data, fourth data, and a power supply voltage;
   filtering the third data and demodulating the third data; and
   filtering the fourth data and demodulating the fourth data.

2. The method of claim 1 wherein the power supply voltage is provided by an electronic device that includes the baseband circuit.

3. The method of claim 1 wherein the power supply voltage is received by an electronic device that includes the baseband circuit.

4. The method of claim 1 wherein the first data is data that is consistent with one of the Thunderbolt, Peripheral Component Interconnect Express, Universal Serial Bus, or Serial Peripheral Interface standards.

5. The method of claim 4 wherein the second data is data that is consistent with one of universal asynchronous receiver/transmitter, Joint Test Action Group, Directed Automated Random Testing, and an identification interface standard.

6. An electronic device comprising:
   a first data path comprising:
      a baseband circuit having a first input/output port to receive and transmit data signals;
      an intermediate frequency modulator/demodulator circuit having a first input/output port coupled to a second input/output port of the baseband circuit; and
      a radio frequency modulator/demodulator circuit having a first input/output port connected directly to a second input/output port of the intermediate frequency modulator/demodulator circuit; and
   a second data path comprising:
      a combiner/splitter circuit having a first input/output port connected directly to the second input/output port of the intermediate frequency modulator/demodulator circuit and the first input/output port of the radio frequency modulator/demodulator circuit, the combiner/splitter circuit having a second input/ output port coupled to a power supply connection, the power supply connection consisting of a power contact and a ground contact, wherein the combiner/splitter circuit receives and transmits data signals via the power supply connection, and receives a power supply voltage via the power supply connection; and a modem circuit having a first input/output port to receive and transmit data and a second input/output port coupled to a third input/output port of the combiner/splitter circuit.

7. The electronic device of claim 6 further comprising an antenna coupled to a second input/output port of the radio frequency modulator/demodulator circuit.

8. The electronic device of claim 7 wherein the combiner/splitter circuit is further coupled to combine an output of the intermediate frequency modulator/demodulator circuit and an output of the modem circuit and to provide the combined signal.

9. The electronic device of claim 8 wherein the combiner/splitter circuit is further coupled to provide the combined signal to the power supply connection.

* * * * *